US012596932B2

(12) United States Patent
Abelha Ferreira et al.

(10) Patent No.: US 12,596,932 B2
(45) Date of Patent: Apr. 7, 2026

(54) METHOD AND SYSTEM FOR DEPLOYMENT OF PREDICTION MODELS USING SKETCHES GENERATED THROUGH DISTRIBUTED DATA DISTILLATION

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 1031 days.

(21) Appl. No.: 17/462,421

(22) Filed: Aug. 31, 2021

(65) Prior Publication Data

US 2023/0066249 A1    Mar. 2, 2023

(51) Int. Cl.
*G06N 5/02*          (2023.01)
*G06F 16/182*        (2019.01)

(52) U.S. Cl.
CPC ............. *G06N 5/02* (2013.01); *G06F 16/182* (2019.01)

(58) Field of Classification Search
CPC .......... G06N 5/02; G06N 3/09; G06F 16/182; G06F 16/1748
See application file for complete search history.

(56) References Cited

U.S. PATENT DOCUMENTS 8,977,621 B1    3/2015  Paiz
9,355,359 B2    5/2016  Welinder et al.

10,853,867 B1 * 12/2020  Bulusu ............... G06Q 30/0631
11,073,828 B2    7/2021  Paden
11,468,128 B1   10/2022  Paiz
11,470,064 B2   10/2022  Lally et al.
11,715,287 B2 *  8/2023  Matveev ................ G06N 20/10
                                              706/25

(Continued)

FOREIGN PATENT DOCUMENTS

EP          3783952 A1       2/2021
WO          2020115273 A1    6/2020
WO          WO-2020205655 A1 * 10/2020   ............. G06N 20/00

OTHER PUBLICATIONS

J. Posner, L. Tseng, M. Aloqaily and Y. Jararweh, "Federated Learning in Vehicular Networks: Opportunities and Solutions," in IEEE Network, vol. 35, No. 2, pp. 152-159, Mar./Apr. 2021, doi: 10.1109/MNET.011.2000430. (Year: 2021).*

(Continued)

*Primary Examiner* — Omar F Fernandez Rivas
*Assistant Examiner* — Corey M Sackalosky
(74) *Attorney, Agent, or Firm* — Chamberlain, Hrdlicka, White, Williams & Aughtry; Aly Z. Dossa

(57)                ABSTRACT

Techniques described herein relate to a method for managing data nodes. The method includes identifying, by a data node manager associated with a plurality of data nodes, a model deployment event; in response to identifying the model deployment event: generating, by the data node manager, a new model using model generation information from a subset of the plurality of data nodes specified by a data node registry; deploying, by the data node manager, the new model to the plurality of data nodes; and updating the data node registry based on the new model to obtain an updated data node registry.

12 Claims, 5 Drawing Sheets

(56)　　　References Cited

U.S. PATENT DOCUMENTS

| | | |
|---|---|---|
| 2009/0195796 A1 | 8/2009 | Monga |
| 2017/0068714 A1 | 3/2017 | Selfridge et al. |
| 2017/0140297 A1 | 5/2017 | Karumanchi et al. |
| 2018/0150724 A1 | 5/2018 | Brock |
| 2019/0294627 A1 | 9/2019 | Chaudhuri et al. |
| 2021/0182912 A1 | 6/2021 | Misra et al. |
| 2021/0248105 A1 | 8/2021 | Gentile et al. |
| 2022/0019829 A1 | 1/2022 | Tal et al. |

OTHER PUBLICATIONS

A. P. Mohamed, A. S. Mohammad Mahdee Jameel and A. El Gamal, "Knowledge Distillation for Wireless Edge Learning," 2021 IEEE Statistical Signal Processing Workshop (SSP), Rio de Janeiro, Brazil, 2021, pp. 600-604, doi: 10.1109/SSP49050.2021.9513752 (Year: 2021).*

Liu, M., Ho, S., Wang, M., Gao, L., Jin, Y., & Zhang, H. (2021). Federated Learning Meets Natural Language Processing: A Survey. arXiv [Cs.CL]. Retrieved from http://arxiv.org/abs/2107.12603 (Year: 2021).*

Endres, D.M. and Schindelin, J.E., "A New Metric for Probability Distributions". IEEE Transactions on Information theory, vol. 49, No. 7, pp. 1858-1860, Jul. 2003 (3 pages).

K. Makino and T. Uno, "New Algorithms for Enumerating All Maximal Cliques", Scandinavian Workshop on Algorithm Theory, pp. 260-272, 2004 (12 pages).

Nelson, J., 2012. "Sketching and Streaming Algorithms for Processing Massive Data". XRDS: Crossroads, The ACM Magazine for Students, 19(1), pp. 14-19.

Wang, T., Zhu, J.Y., Torralba, A. and Efros, A.A., 2018. "Dataset Distillation". arXiv preprint arXiv:1811.10959. v3. Feb. 24, 2020.

H. Brendan McMahan et al.; "Communication-Efficient Learning of Deep Networks from Decentralized Data"; Proceedings of the 20th International Conference on Artificial Intelligence and Statistics, Proceedings of Machine Learning Research (PMLR); vol. 54; pp. 1273-1282; 2017 (http://proceedings.mlr.press/v54/mcmahan17a. html).

Konecny et al., Federated Learning: Strategies for Improving Communication Efficiency, Oct. 18, 2016, 5 pages.

Li et al., Federated Learning: Challenges, Methods, and Future Directions, Aug. 21, 2019, 21 pages.

Wang et al., Dataset Distillation, Nov. 27, 2018, 14 pages.

Zhou et al., Distilled On-Shot Federated Learning, Oct. 26, 2020, 14 pages.

Pacharaney, Utkarsha S., and Rajiv Kumar Gupta, Clustering and Compressive Data Gathering in Wireless Sensor Network, Clustering and Compressive Data Gathering in Wireless Sensor Network, Wireless Personal Communications 109.2 (2019), 20 Pages, Year: 2019.

Ang, Hock Hee, et al., Predictive Handling of Asynchronous Concept Drifts in Distributed Environments, IEEE Transactions on Knowledge and Data Engineering, 12 Pages, 2012.

Berestizshevsky, Konstantin, and Guy Even, Dynamically Sacrificing Accuracy for Reduced Computation: Cascaded Inference Based on Softmax Confidence, 12 Pages, 2019.

Bagherjeiran, Abraham et al., Adaptive clustering: Better representatives with reinforcement learning, Adaptive clustering: Better representatives with reinforcement learning, Unknown, Jan. 10, 2005.

De Smet, Frank, et al., Adaptive quality-based clustering of gene expression profiles, Adaptive quality-based clustering of gene expression profiles, 12 pages, Year: 2001.

Lin, Wei-Chao, et al., Clustering-based undersampling in class-imbalanced data, Clustering-based undersampling in class-imbalanced data, Information Sciences, 10 pages, Year: 2017.

* cited by examiner

400

Output Device 408

Processor(s) 402

Communication Interface 412

Non-Persistent Storage 404

Persistent Storage 406

Input Device 410

METHOD AND SYSTEM FOR DEPLOYMENT OF PREDICTION MODELS USING SKETCHES GENERATED THROUGH DISTRIBUTED DATA DISTILLATION

BACKGROUND

Computing devices may provide services. To provide the services, the computing devices may generate and/or use data. The data may be used to generate prediction models. The prediction models may be used to provide the aforementioned services. Additionally, the data may be transmitted between computing devices to generate the prediction models. The data may be processed by the computing devices to generate the prediction models.

SUMMARY

In general, certain embodiments described herein relate to a method for managing data nodes. The method may include identifying, by a data node manager associated with a plurality of data nodes, a model deployment event; in response to identifying the model deployment event: generating, by the data node manager, a new model using model generation information from a subset of the plurality of data nodes specified by a data node registry; deploying, by the data node manager, the new model to the plurality of data nodes; and updating the data node registry based on the new model to obtain an updated data node registry.

In general, certain embodiments described herein relate to a non-transitory computer readable medium that includes computer readable program code, which when executed by a computer processor enables the computer processor to perform a method for managing data nodes. The method may include identifying, by a data node manager associated with a plurality of data nodes, a model deployment event; in response to identifying the model deployment event: generating, by the data node manager, a new model using model generation information from a subset of the plurality of data nodes specified by a data node registry; deploying, by the data node manager, the new model to the plurality of data nodes; and updating the data node registry based on the new model to obtain an updated data node registry.

In general, certain embodiments described herein relate to a system for managing data of data nodes. The system may include a data node manager associated with a plurality of data nodes. The data node manager may include a processor and memory, and may be configured to identify a model deployment event; in response to identifying the model deployment event: generate a new model using model generation information from a subset of the plurality of data nodes specified by a data node registry; deploy the new model to the plurality of data nodes; and update the data node registry based on the new model to obtain an updated data node registry.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
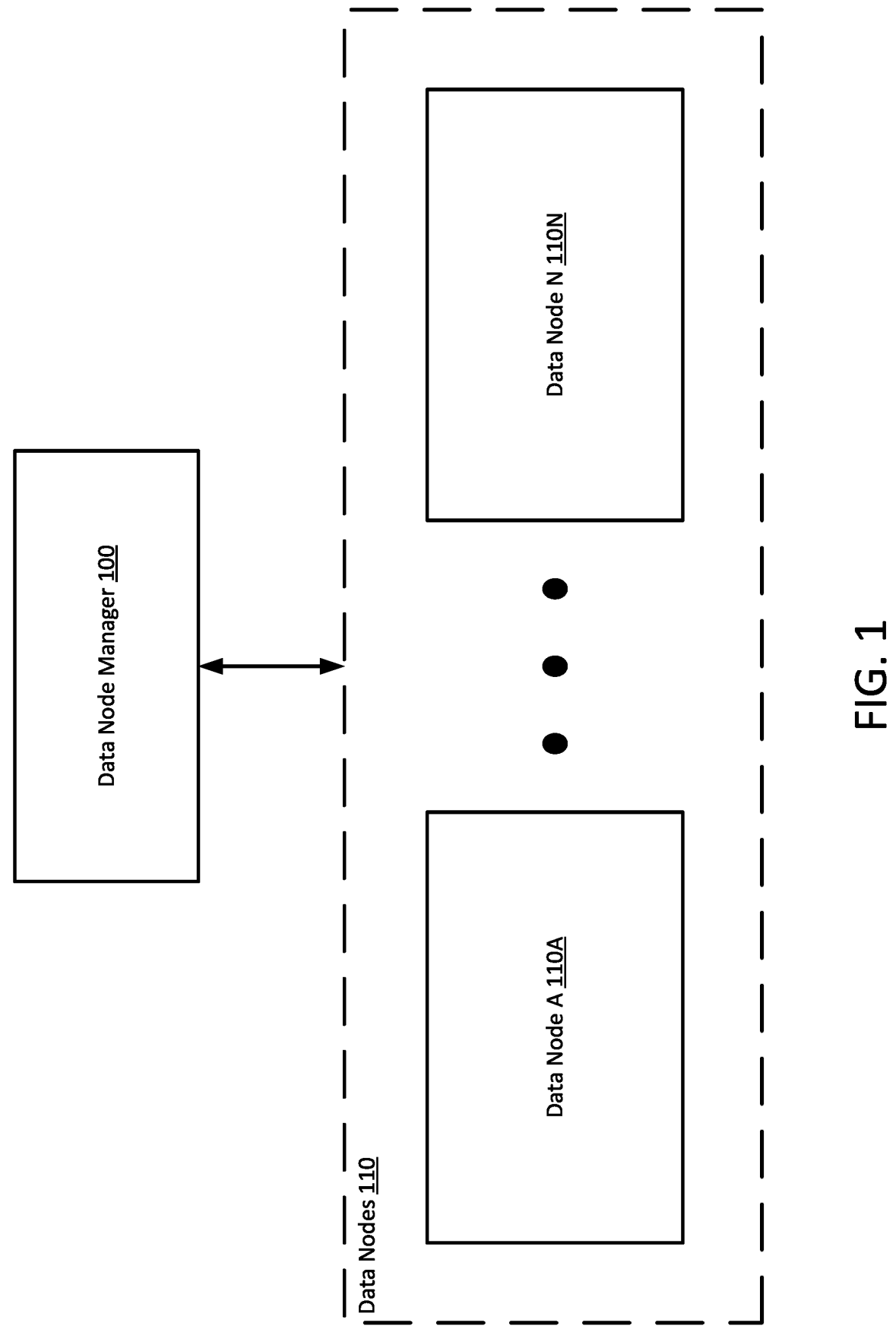
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for deploying prediction models using sketches generated through distributed dataset distillation.

In one or more embodiments of the invention, data nodes use prediction models to provide computer implemented services for users. Such prediction models may require large quantities of data for training. The data nodes may not include the computing resources or the time necessary to perform prediction model training. The data nodes may therefore obtain trained models from another entity such as a data node manager. The data node manager may require data representative of the data nodes to generate prediction models for the data nodes.

Therefore, large quantities of data may be transmitted between data nodes and the data node manager to train prediction models, resulting in the use of large portions of computing resources of the data nodes and the data node manager to obtain and transmit the large quantities of data. Additionally, by sharing such data, data nodes may be vulnerable to privacy and/or security issues. Furthermore, as additional data nodes are connected to the data node manager, the data node manager must generate prediction models using data representative of the large, dynamic environment of data nodes.

To address, at least in part, the aforementioned problems that may arise when generating prediction models for data nodes, in one or more embodiments of the invention, a data node manager deploys prediction models to data nodes using distributed dataset distillation. Data nodes may include the same type of predictions models. For example, the data nodes may include security cameras that capture images. Each data node may run facial recognition prediction models using the images captured by the security cameras.

In one or more embodiments of the invention, the data node manager when a new data node model is deployed, the data node manager first deploys a previously generated prediction model to the new data node. As such, a prediction model may be efficiently deployed to new data nodes. In parallel, the data node manager may identify a subset of registered data nodes to send requests for sketches. In one or more embodiments of the invention, a sketch is one or more data structures that include synthetic data representative of data node data generated through the performance of one or more dataset distillations. The sketches may include less data than is traditionally required to generate prediction models. Each of the data nodes of the subset of registered may generate sketches through the performance of dataset distillations. The data node manager may obtain and merge together the sketches to obtain a central sketch representative of each data node of the subset of registered data nodes. The data node manager may use the central sketch to generate and deploy a new prediction model to the registered data nodes (i.e., not the new data nodes). The registered data nodes may perform optimizations on the deployed new model using verification data associated with the registered data nodes to improve the performance of the new prediction model. The data node manager may update a data node registry to include the new data nodes, which now may be used to identify subsets of registered data nodes in future prediction model deployments.

Accordingly, prediction models may be deployed to data nodes without the transmission of large quantities of data node data typically required to train prediction models representative of a large number of data nodes in a dynamic environment. This may improve the efficiency of deploying prediction models to data nodes by circumventing the requirement of transmission of large quantities of data node data between the data nodes and the data node manager to deploy prediction models. Additionally, sketches obtained from a subset of registered data nodes representative of the data nodes, may be used to efficiently deploy new prediction models to data nodes as the quantity of data nodes grow without compromising prediction model accuracy. By using distributed distillation to deploy prediction models, the data nodes may reduce the amount of data stored locally for prediction model training purposes.

FIG. 1 shows a diagram of a system in accordance with one or more embodiments of the invention. The system may include a data node manager (100) and data nodes (110). The data nodes (110) may include any quantity of data nodes without departing from the invention. For example, the data nodes (110) may include data node A (110A) and data node N (110N). The system may include other and/or additional devices and/or components without departing from the invention. The devices and components of the system illustrated in FIG. 1 may be operatively connected via any combinations of wired (e.g., Ethernet) and/or wireless (e.g., WAN) connections without departing from the invention. Each of the aforementioned components of the system of FIG. 1 is discussed below.

In one or more embodiments of the invention, the data node manager (100) includes the functionality to perform prediction model deployment services for the data nodes (110). The prediction model deployment services may include generating prediction models using sketches obtained from the data nodes (110) and deploying the generated prediction models to the data nodes (110). To perform the prediction model generation services, the data node manager (100) may include the functionality to perform the methods depicted in FIG. 2A. For additional information regarding the functionality of the data node manager (100), refer to FIG. 2A. The data node manager (100) may include other and/or additional functionalities without departing from the invention.

In one or more embodiments of the invention, the data node manager (100) is implemented as one or more computing devices. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof. In one or more embodiments of the invention, the data node manager (100) includes more computing resources (i.e., the components discussed above) than the data nodes (110) to generate and deploy prediction models. For additional information regarding computing devices, refer to FIG. 4.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors, and/or other hardware components, to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments of the invention, the data nodes (110) include the functionality to perform computer implemented actions and/or services and obtain prediction model deployment services from the data node manager (100). The computer implemented actions and/or services may include any computer implemented functionality without departing from the invention. The computer implemented functionality may include, for example, inferencing, classification, data analysis, data processing, providing services to client devices, serving web content via the Internet, data backup services, etc.

In one or more embodiments of the invention, to obtain prediction model deployment services from the data node manager (100), the data nodes (110) include the functionality to generate sketches. To generate sketches, the data nodes (110) may include the functionality to perform the methods depicted in FIG. 2B. For additional information regarding generating sketches, refer to FIG. 2B. The data nodes (110) may include other and/or additional functionalities without departing from the invention.

In one or more embodiments of the invention, the data nodes (110) are implemented as computing devices. The computing devices may be an embodiment of the computing device discussed above. For additional information regarding computing devices, refer to the above discussion or to FIG. 4.

Figure 2A:
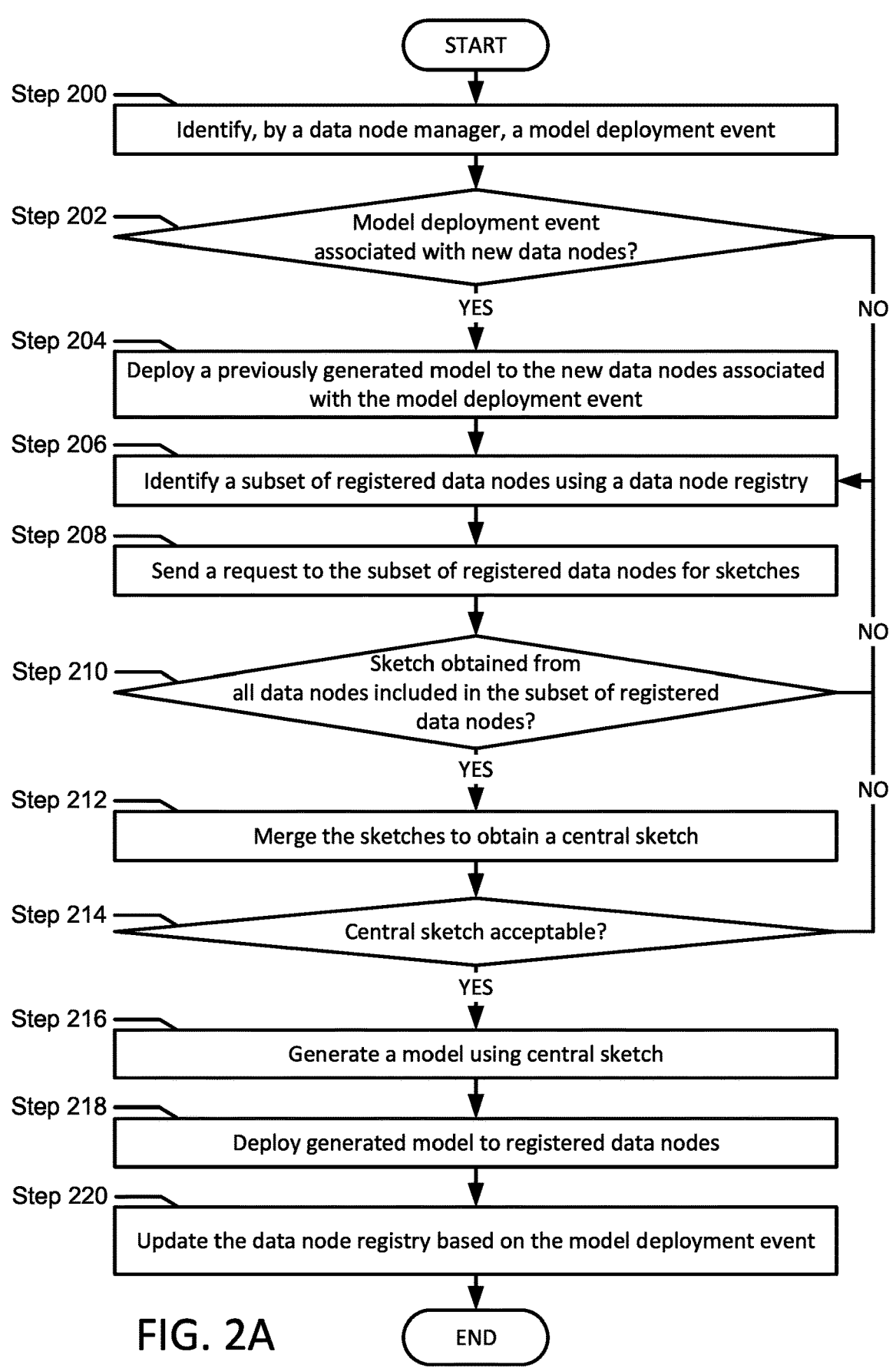
FIG. 2A shows a flowchart of a method in accordance with one or more embodiments of the invention.

FIG. 2A shows a flowchart of a method in accordance with one or more embodiments of the invention. The method depicted in FIG. 2A may be performed by a data node manager to generate and deploy prediction models to data nodes. All, or a portion of, the method of FIG. 2A may be performed by other components illustrated in FIG. 1 without departing from the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a model deployment event is identified by the data node manager. In one or more embodiments of the invention, the model deployment event may include any event that indicates a prediction model is to be deployed to one or more data nodes without departing from the invention. The model deployment may be, for example, new data nodes are deployed and connected to the data node manager. The model deployment event may also be for example, the expiration of the models deployed to the data nodes connected to the data node manager. As a result, the data node may require an updated prediction model. The model deployment events may include other and/or additional event indicating the deployment of prediction models is required without departing from the invention.

In one or more embodiments of the invention, the data node manager obtains a message. The message may include a request to deploy a prediction model to a new data node and/or registered data nodes. The message may also include the data node identifiers associated with the request. The message may include other and/or additional information (e.g., communication information) without departing from the invention. The message may be obtained from one or more data nodes or a user of the system. The data node manager may identify the receipt of the aforementioned message as a model deployment event. The message may be provided to the data node manager using any appropriate method of data transmission without departing from the invention. As an example, the data nodes or a user may communicate the message as network data traffic units over a series of network devices that operatively connect to the data nodes or the user to the data node manager. The model deployment event may be identified by the data node manager via other and/or additional methods without departing from the invention.

In one or more embodiments of the invention, the data node manager monitors a data node registry to identify when the previously generated model deployed to the registered data nodes has expired.

The data node manager may include a data node registry. The data node registry may be one or more data structures that include information associated with the data nodes registered with the data node manager. The information may include, for example, data node identifiers (e.g., unique combinations of bits used to specify particular data nodes), previously generated models deployed to the registered data nodes, timestamps associated with the point in time in which the previously generated models were deployed to the data nodes, communication information (e.g., network address, port number, etc.) used to transmit data between the data nodes and the data node manager, and a configurable expiration period. The information included in the data node registry may include a list of unavailable data nodes that may not be included in the subset of registered data nodes to generate sketches. The information included in the data node registry may also include a list of data nodes included in the subset of registered data nodes to generate sketches. The information included in the data node registry may include other and/or additional information associated with the data nodes without departing from the invention. The data node registry may be updated by the data node manager when the data node manager deploys prediction models to the data nodes. The data node manager may use the data node registry to identify model deployment events, deploy previously generated models to new data nodes, and to identify subsets of registered data nodes to generate sketches (discussed below).

The data node registry may be stored in one or more storage devices of the data node manager and/or connected to the data node manager. The storage devices may include any type of storage devices (e.g., hard disk drives, RAM, network storages, etc.) without departing from the invention.

The data node manager may monitor the data node registry to identify when the configurable expiration period associated with the previously deployed models has expired. The configurable expiration period may specify an amount of time after which a previously deployed model is to be replaced with the deployment of a newly generated prediction model. The data node manager may identify the expiration of the configurable expiration period as the model deployment event. The model deployment event may be identified by the data node manager via other and/or additional methods without departing from the invention.

In Step 202, a determination is made as to whether the model deployment event is associated with new data nodes. In one or more embodiments of the invention, the data node manager uses model deployment event and/or the data node registry to determine whether the deployment event is associated with one or more new data nodes. If the model deployment event is associated with the expiration of the configurable expiration period of the registered data nodes or is associated with a message that includes the request to deploy a new model that does not include a data node identifier that is not included in the data node registry, then the data node manager may determine that the model deployment event is not associated with new data nodes. If the model deployment event is associated with a message that includes the request to deploy a new model and does include one or more data node identifiers that are not included in the data node registry, then the data node manager may determine that the model deployment event is associated with new data nodes. The determination as to whether the model deployment event is associated with new data nodes may be made via other and/or additional methods without departing from the invention.

In one or more embodiments of the invention, if it is determined that the model deployment event is associated with new data nodes, then the method proceeds to Step 204. In one or more embodiments of the invention, if it is determined that the model deployment event is not associated with new data nodes, then the method proceeds to Step 206.

In Step 204, a previously generated model is deployed to the new data nodes associated with the model deployment event. In one or more embodiments of the invention, the data node manager identifies the previously generated model using the data node registry. As discussed above, the data node registry includes previously generated models and timestamps associated with the points in time in which the previously generated models were deployed. The data node manager may identify the previously generated model associated with the most recent timestamp as the previously generated model. The data node manager may also identify the new data nodes using the data node identifiers included in the message obtained as the model deployment event. The data node manager may identify all data node identifiers included in the message that are not also included in the data node registry as new data nodes.

In one or more embodiments of the invention, the data node manager sends a message to the new data nodes using the communication information included in the message obtained in Step 200. The message may include the previously generated model. The message may include other and/or additional information associated with the previously generated model without departing from the invention. The previous model may be provided to the new data nodes using any appropriate method of data transmission without departing from the invention. As an example, the data node manager may communicate the previous model as network data traffic units over a series of network devices that operatively connect the new data nodes to the data node manager. The previously generated model may be deployed to the new data nodes associated with the model deployment event by the data node manager via other and/or additional methods without departing from the invention.

In Step 206, a subset of registered data nodes is identified using a data node registry. In one or more embodiments of the invention, the data node manager uses the data node registry to identify a subset of registered data nodes.

If the data node registry includes an empty list of data nodes unavailable data nodes and an empty list of data nodes included in the subset of registered data nodes (i.e., this is the first attempt to identify a subset of registered data nodes), then the data node manager may identify the subset of registered data nodes by randomly selecting data node identifiers associated with registered data nodes included in the data node registry. Other selection methods may be used to identify the subset of registered data nodes without departing from the invention. For example, the data node manager may select data nodes in every geographic region in which data nodes are deployed to obtain sketches representative of all data nodes. Additionally, the data node manager may periodically obtain telemetry data from the data nodes that specifies whether the data nodes are capable of performing dataset distillations. The telemetry data may include, for example, number of verification data samples included in the data nodes, the computing resource capacities associated with the data nodes, and/or other information that may specify whether data nodes are available to perform dataset distillation without departing from the invention. The data node manager may update the list of unavailable data nodes based on the obtained telemetry data. The data node manager may update the list of data nodes included in the subset of registered data nodes to include the selected data nodes.

The data node manager may select enough data nodes to satisfy a configurable data node threshold that specifies the minimum amount of data nodes to include in the subset of registered data nodes to obtain an acceptable central sketch (discussed below). The configurable data node threshold may be provided to the data node manager by a user of the system and may be included in the data node registry.

If the data node registry includes a list of data nodes that are unavailable and a list of data nodes included in the subset of registered data nodes (i.e., not the first attempt to identify a subset of registered data nodes), then the data node manager may identify the subset of registered data nodes by selecting data node identifiers of data nodes not included in the list of unavailable data nodes or the list of data nodes included in the subset of registered data nodes (i.e., data nodes already included in the subset of registered data nodes) to meet the data node threshold. If there are no other data nodes that are not included in the list of unavailable data nodes or not included in the list of data nodes already included in the subset of registered data nodes, the data node manager may lower the data node threshold by one or more configurable data node threshold steps obtained from a user until the data node threshold is met.

Alternatively, in another embodiment of the invention, if there are no other data nodes that are not included in the list of unavailable data nodes or not included in the list of list of data nodes already included in the subset of registered data nodes, then the data node manager may end the method and wait until another model deployment event is identified (i. e., Step 200) or wait for a configurable amount of time in which unavailable data nodes may become available and be selected into the subset of registered data nodes.

In Step 208, a request for sketches is sent to the subset of registered data nodes. In one or more embodiments of the invention, the data node manager sends a message to the subset of registered data nodes. The message may include a request to generate sketches. The message may include other and/or additional information associated with the request to generate sketches without departing from the invention. The request to generate sketches may be provided to the data nodes of the subset of registered data nodes using any appropriate method of data transmission without departing from the invention. As an example, the data node manager may communicate the request as network data traffic units over a series of network devices that operatively connect the data nodes to the data node manager. The request may be sent to the subset of registered data nodes via other and/or additional methods without departing from the invention.

In Step 210, a determination is made as to whether a sketch is obtained from all data nodes included in the subset of registered data nodes. In one or more embodiments of the invention, the data node manager monitors the responses of each data node included in the subset of registered data nodes to the requests sent in Step 208. Each of the data nodes' responses may include sketches generated by the data nodes or notifications that the data node is unavailable. If all responses from the data nodes include sketches generated by the data nodes, then the data node manager may determine that a sketch was obtained from all data nodes included in the subset of registered data nodes. If a response from a data node includes a notification that the data node is unavailable, then the data node manager may determine that a sketch was not obtained from all data nodes of the subset of registered data nodes. The data node manager may update the list of unavailable data nodes to include the data nodes from which the responses includes notifications of unavailability. The determination as to whether a sketch is obtained from all data nodes of the registered data nodes may be made via other and/or additional methods without departing from the invention.

In one or more embodiments of the invention, if it is determined that a sketch is obtained from all data nodes included in the subset of registered data nodes, then the method proceeds to Step 212. In one or more embodiments of the invention, if it is determined that a sketch is not obtained from all data nodes included in the subset of registered data nodes, then the method proceeds to Step 206.

In Step 212, the sketches are merged to obtain a central sketch. In one or more embodiments of the invention, the data node manager merges the sketches obtained from each data node into a single collection (e.g., file) to obtain a central sketch where the data node manager may use all of the sketches obtained from each data node. The data node manager may perform multiple merges as sketches are obtained from each data node of the subset of registered data nodes or the data node manager may perform a single merge of the sketches when sketches are obtained from all data nodes of the subset of registered data nodes without departing from the invention. Additionally, the data node manager may merge the sketches with one or more previously generated central sketches stored in the data node registry.

In one or more embodiments of the invention, the data node manager may perform deduplication on the sketches during the merging of the sketches. Any appropriate method of deduplication may be used to perform deduplication without departing from the invention. For example, the data node manager may delete duplicate samples included in the sketches to perform deduplication. As another example, the data node manager may delete highly similar samples included in the sketches (i. e., soft deduplication) to perform deduplication. The sketches may be merged to obtain the central sketch via other and/or additional methods without departing from the invention.

In Step 214, a determination is made as to whether the central sketch is acceptable. In one or more embodiments of the invention, the data node manager uses a central sketch threshold to determine whether the central sketch is acceptable. The central sketch threshold may be a configurable minimum amount of samples (e.g., images) required to be included in the central sketch in order for the central sketch to be acceptable to use to generate a prediction model. The central sketch threshold may be provided to the data node manager by a user of the system and stored in the data node registry. If the number of samples included in the central sketch does not satisfy the central sketch threshold, then the data node manager may determine that the central sketch is not acceptable. If the number of samples included in the central sketch does satisfies the central sketch threshold, then the data node manager may determine that the central sketch is acceptable. The determination as to whether the central sketch is acceptable may be made via other and/or additional methods without departing from the invention.

In one or more embodiments of the invention, if it is determined that the central sketch is acceptable, then the method proceeds to Step 216. In one or more embodiments of the invention, if it is determined that the central sketch is not acceptable, then the method proceeds to Step 206.

In Step 216, a model is generated using the central sketch. In one or more embodiments of the invention, the data node manager applies initial model parameters (e.g., neural network weights, learning rates, etc.) and a prediction model training algorithm to the central sketch to generate a prediction model. The initial model parameters may be obtained from a user of the system and may be shared between the data nodes and the data node manager. The prediction model may include, for example, one or more neural networks. The prediction model may include other types of prediction models (e.g., random forest models, linear regression models, classification and regression tree models, etc.) without departing from the invention. A model may be generated using the central sketch via other and/or additional methods without departing from the invention.

In Step 218, the generated model is deployed to the registered data nodes. In one or more embodiments of the invention, the data node manager sends a message to the registered data nodes. The message includes the generated prediction model. The message may include other and/or additional information associated with the generated prediction model without departing from the invention. The prediction model may be provided to the registered data nodes using any appropriate method of data transmission without departing from the invention. As an example, the data node manager may communicate the generated prediction model as network data traffic units over a series of network devices that operatively connect to the registered data nodes to the data node manager. The generated prediction model may be deployed to the registered data nodes by the data node manager via other and/or additional methods without departing from the invention.

In Step 220, the data node registry is updated based on the model deployment event. In one or more embodiments of the invention, the data node manager updates the data node registry to include data node information (e.g., the data node identifier, the communication information, and prediction model deployed to the data node) associated with new data nodes. As a result, the new data nodes may be included in the selection of a subset of registered data nodes for future model deployment events. Additionally, the data manager may update the data node registry to include the newly generated central sketch, the newly generated prediction model, and the respective timestamps associated with the central sketch and the newly generated prediction model. The data node manager may also associate the data node identifiers with the currently deployed prediction model associated with each data node (i.e., the previously generated prediction model may be associated with new data nodes and the newly generated prediction model may be associated with the registered data nodes). The data node registry may be updated based on the model deployment event via other and/or additional methods without departing from the invention.

In one or more embodiments of the invention, the method ends following Step 220.

Figure 2B:
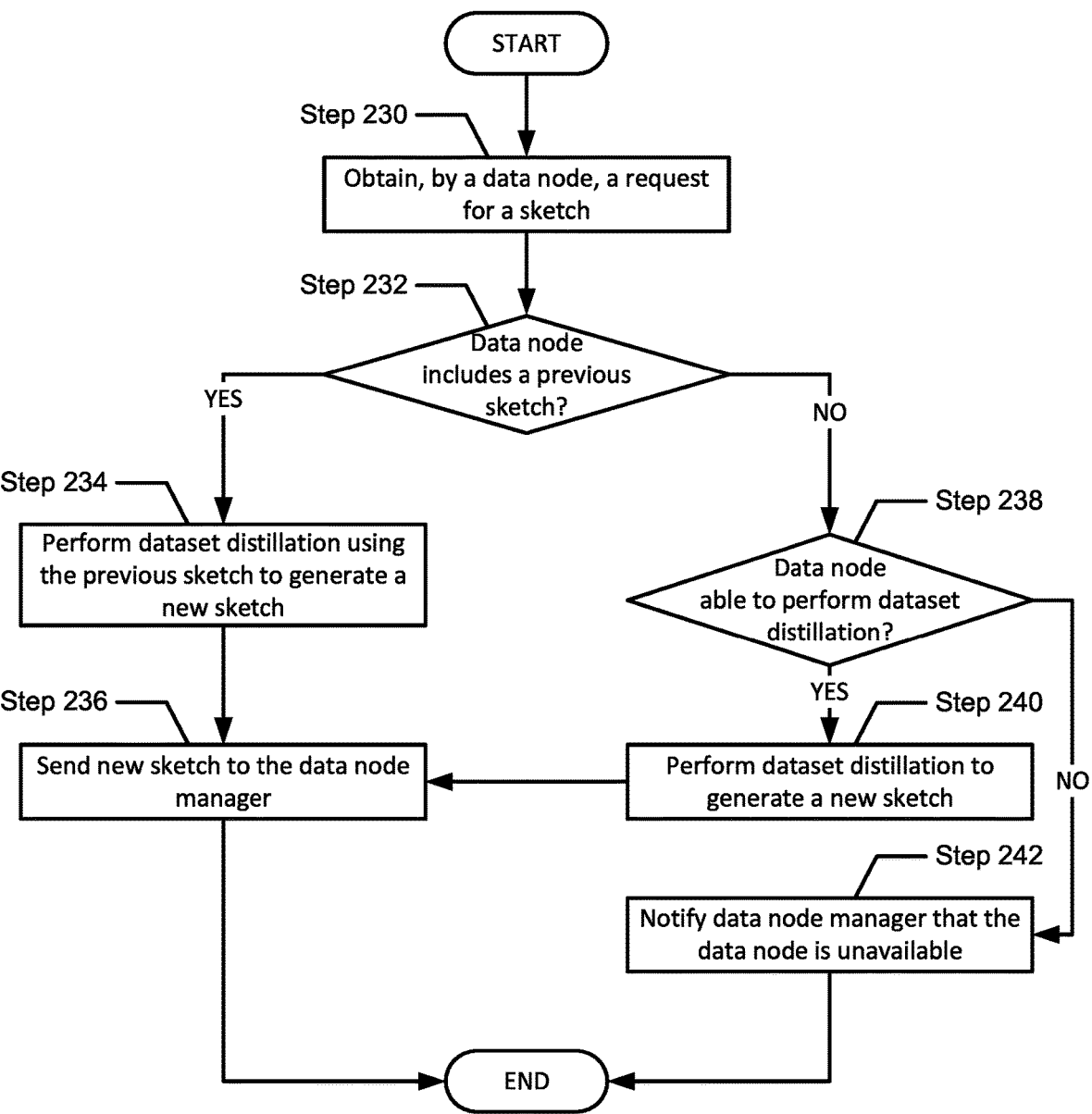
FIG. 2B shows a flowchart of a method in accordance with one or more embodiments of the invention.

FIG. 2B shows a flowchart of a method in accordance with one or more embodiments of the invention. The method depicted in FIG. 2B may be performed by a registered data node of the data nodes to generate a sketch. All, or a portion of, the method of FIG. 2B may be performed by other components illustrated in FIG. 1 without departing from the invention.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 230, a request for a sketch is obtained by the data node. In one or more embodiments of the invention, the data node obtains a message from the data node manager. The message may include a request to generate a sketch. The message may include other and/or additional information associated with the request to generate sketches (i.e., initial model parameters to user to perform dataset distillation) without departing from the invention. The request to generate sketches may be provided to the data node using any appropriate method of data transmission without departing from the invention. As an example, the data node manager may communicate the request as network data traffic units over a series of network devices that operatively connect the data node to the data node manager. The request for a sketch may be obtained by the data node via other and/or additional methods without departing from the invention.

In Step 232, a determination is made as to whether the data node includes a previous sketch. The data node may have previously generated a sketch that was used by the data node manager to generate a previous prediction model. The data node may have stored the previously generated sketch in a storage device of the data node or otherwise connected to the data node. The storage device may include any type of storage device without departing from the invention. If the data node includes a previously generated sketch stored in a storage device of the data node, then the data node may determine that the data node includes a previously generated sketch. If the data node does not include a previously generated sketch (i.e., never generated one or deleted it) stored in a storage device of the data node, then the data node may determine that the data node does not include a previously generated sketch. The determination as to whether the data node includes a previous sketch may be made via other and/or additional methods without departing from the invention.

In one or more embodiments of the invention, if it is determined that the data node includes a previously generated sketch, then the method proceeds to Step 234. In one or more embodiments of the invention, if it is determined that the data node does not include a previously generated sketch, then the method proceeds to Step 238.

In Step 234, the data node performs dataset distillation using the previous sketch to generate a new sketch. In one or more embodiments of the invention, the data node optimizes the previous sketch through the performance of one or more dataset distillations. The data node may use any appropriate method of dataset distillation without departing from the invention.

For example, the data node may generate a model by inputting initial model parameters associated with a family of models of the data nodes to a prediction model training algorithm. The initial model parameters may include the learning rate and a model distribution used to initialize the model. The data node may apply the generated model to the previous sketch to optimize the model based on the sketch. The data node may then use verification data associated with the data node to perform model verification. In one or more embodiments of the invention, the data node performs model verification using the model and the verification data by applying the model to the verification data of the data node and comparing the predictions of the model with the verification data. The verification data may include labeled data (e.g., images with labels that may be used to verify predictions) that may be used for model verification. The data node may calculate losses (e.g., loss functions) based on the model verification. The data node may generate sketch update parameters that may include, for example, directions and size of steps (i. e., gradient descent steps) to use to update both the synthetic data included in the sketch and the learning rate used to generate the model. The sketch update parameters may be applied to the previous sketch to generate a new sketch that may result in the generation of a new model that experiences a reduction of the losses (i. e., generates more accurate predictions) when applied to the verification data of the data node compared to that of the previous model. This process may include one dataset distillation.

The data node may perform a configurable number of dataset distillations to generate the new sketch, with each dataset distillation improving the sketch of the previous dataset distillation. The configurable number of dataset distillations may be provided by a user of the system. The final sketch may be the new sketch. The data node may perform dataset distillation using the previous sketch to generate a new sketch via other and/or additional methods without departing from the invention.

In Step 236, the new sketch is sent to the data node manager. In one or more embodiments of the invention, the data node sends a message to the data node manager. The message may include the new sketch. The message may include other and/or additional information without departing from the invention. The new sketch may be provided to the data node manager using any appropriate method of data transmission without departing from the invention. As an example, the data node may communicate the new sketch as network data traffic units over a series of network devices that operatively connect the data node to the data node manager. The new sketch may be sent to the data node manager via other and/or additional methods without departing from the invention.

In one or more embodiments of the invention, the method ends following Step 236.

In Step 238, a determination is made as to whether the data node is able to perform dataset distillation. The performance of dataset distillation without a previously generated sketch may require a significant amount of computing resources and verification data, more than is required if a previous sketch is available. As a result, data nodes performing computer implemented services may be unavailable to perform dataset distillations without a previously generated sketch. In one or more embodiments of the invention, the data node determines whether the data node is available to perform dataset distillation based data availability and computer resource utilization.

The data availability may refer to whether data node includes a sufficient quantity of verification data to perform dataset distillations. The request obtained in Step 230 may specify a minimum quantity of samples required to be included in the verification data to perform dataset distillation. The minimum quantity of samples may be calculated by the data node manager based on telemetry data obtained from data nodes that specifies the amount of verification data used in the performance of previous dataset distillations by the data nodes. The minimum quantity of samples may also be obtained from a user of the system.

The computer resource utilization may specify minimum computing resource capacity required to perform dataset distillations. The computing resource capacity may include, for example, storage availability, processor availability, memory availability and/or other types of computing resource capacities without departing from the invention. The request obtained in Step 230 may also specify the computing resource capacity required of the data node to perform dataset distillation. The required computing resource capacity may be calculated by the data node manager based on telemetry data obtained from data nodes that specifies the capacity of computing resources used in the performance of previous dataset distillations by the data nodes. The required computing resource capacity may also be obtained from a user of the system.

The data node may be performing one or more computer implemented services at the point in time in which the request of Step 230 was obtained. Such performances of computer implemented services may utilize computing resource capacities of the data node. The data node may monitor the available computing resource capacity.

In one or more embodiments of the invention, the data node compares the amount of verification data included with the data node with the minimum quantity of samples. The data node may also compare the available computing resource capacity with the minimum computing resource capacity. If the data node does not include the minimum quantity of samples in the verification data associated with the data node or if the data node does not include the minimum required computing resource capacities, then the data node may determine that the data node is not able to perform dataset distillation. If the data node does include the minimum required quantity of samples in the verification data associated with the data node and if the data node does include the minimum required computing resource capacities, then the data node may determine that the data node is able to perform dataset distillation. The determination whether the data node is able to perform dataset distillation may be made via other and/or additional methods without departing from the invention.

In one or more embodiments of the invention, if it is determined that the data node is able to perform dataset distillation, then the method proceeds to Step 240. In one or more embodiments of the invention, if it is determined that the data node is not able to perform dataset distillation, then the method proceeds to Step 242.

In Step 240, the data node performs dataset distillation to generate a new sketch. In one or more embodiments of the invention, the data node generates and optimizes a sketch through the performance of one or more dataset distillations. The data node may use any appropriate method of dataset distillation without departing from the invention.

For example, the data node may generate a sketch that includes randomized synthetic data relevant to the models used by the data nodes. For example, for images used for a facial recognition model, the data node manager may generate a random initial distilled dataset that includes synthetic white noise images using any appropriate methods of generating white noise images without departing from the invention. The data node manager may generate a random initial distilled dataset using any type of randomly generated data associated with the models used by the data nodes without departing from the invention.

In one or more embodiments of invention, the data node may generate a model by inputting initial model parameters associated with a family of models of the data nodes to a prediction model training algorithm. The initial model parameters may include the learning rate and a model distribution used to initialize the model. The data node may apply the generated model to the random initial sketch to optimize the model based on the sketch. The data node may then use verification data associated with the data node to perform model verification. In one or more embodiments of the invention, the data node performs model verification using the model and the verification data by applying the model to the verification data of the data node and comparing the predictions of the model with the verification data. The verification data may include labeled data (e.g., images with labels that may be used to verify predictions) that may be used for model verification. The data node may calculate losses (e.g., loss functions) based on the model verification. The data node may generate sketch update parameters that may include, for example, directions and size of steps (i.e., gradient descent steps) to use to update both the synthetic data included in the sketch and the learning rate used to generate the model. The sketch update parameters may be applied to the previous sketch to generate a new sketch that may result in the generation of a new model that experiences a reduction of the losses (i. e., generates more accurate predictions) when applied to the verification data of the data node compared to that of the previous model. This process may include one dataset distillation.

The data node may perform a configurable number of dataset distillations to generate the new sketch, with each dataset distillation improving the sketch of the previous dataset distillation. The configurable number of dataset distillations may be provided by a user of the system. The final sketch may be the new sketch. The data node may perform dataset distillation to generate a new sketch via other and/or additional methods without departing from the invention.

In one or more embodiments of the invention, the method proceeds to Step 236 following Step 240.

In Step 242, the data node manager is notified that the data node is unavailable. In one or more embodiments of the invention, the data node sends a message to the data node manager. The message may include a notification that the data node is unavailable. The message may include other and/or additional information (i.e., telemetry data specifying why the data node is unavailable) without departing from the invention. The notification may be provided to the data node manager using any appropriate method of data transmission without departing from the invention. As an example, the data node may communicate the notification as network data traffic units over a series of network devices that operatively connect the data node to the data node manager. The data node manager may be notified that the data node is unavailable via other and/or additional methods without departing from the invention.

In one or more embodiments of the invention, the method ends following Step 242.

EXAMPLE

Figure 3:
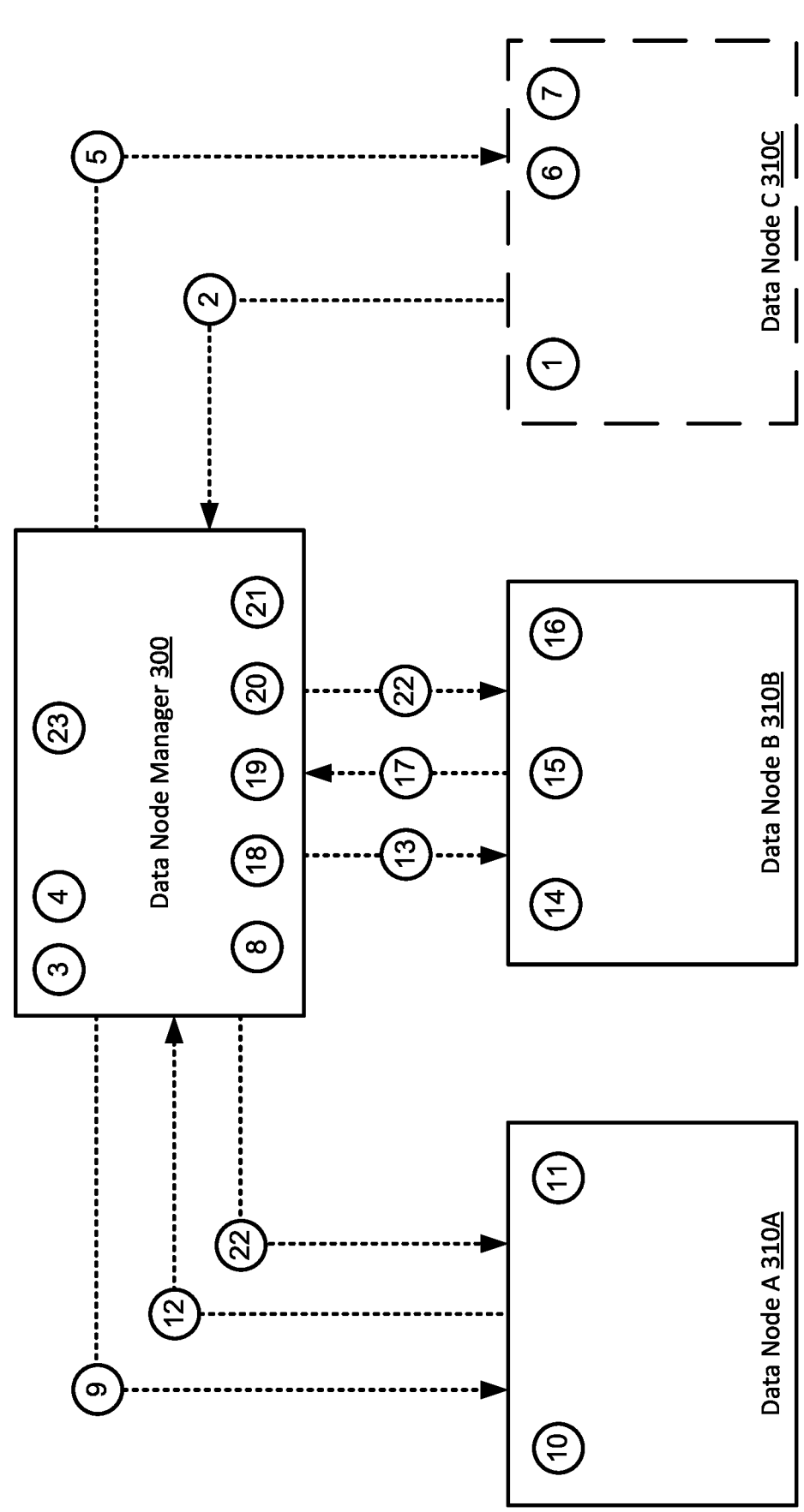
FIG. 3 shows a diagram of the operation of an example system over time in accordance with one or more embodiments of the invention.

FIG. 3 shows a diagram of the operation of an example system over time in accordance with one or more embodiments of the invention. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 3, consider a scenario in which a car company has deployed smart vehicles in the United States. Each smart vehicle uses inferencing to perform autopilot using cameras attached to the vehicle. The car company wants to deploy inferencing models to the vehicles over time. To do so, the car company sets up a data center that is operatively connected to each of the vehicles to deploy models to the vehicles.

In such a scenario, the car company data center is the data node manager (300), while the vehicles are data nodes. The first two vehicles, data node A (310A) and data node B (310B) were previously deployed and include a prediction model generated and deployed by the data node manager at some prior point in time. The third vehicle, data node C (310C) is deployed at the start of the example and is denoted by a dashed box in FIG. 3. Each data node (310A, 310B, 310C) is operatively connected to the data node manager (300).

At Step 1, data node C (310C) is sold to a customer, and deployed. Data node C (310C) is operatively connected to the data node manager (300). Data node C (310C) requires the deployment of a prediction model from the data node manager (300). As a result, at Step 2, data node C (310C) sends a model deployment request to the data node manager (300). The data node manager (300) identifies obtaining the request as a model deployment event. In response to identifying the model deployment event, at Step 3, the data node manager (300) makes a determination that the model deployment event is associated with a new data node. In response to the determination, at Step 4, the data node manager (300) identifies the previously generated prediction model deployed in data node A (310A), and data node B (310B) included in the data node registry (not shown). At Step 5, the data node manager (300) sends the previous prediction model to data node C (310C). After obtaining the previously generated model, at Step 6, data node C (310C) optimizes the previously generated model using verification data associated with data node C (310C). At Step 7, data node C (310C) uses the optimized previously generated model to perform inferencing.

At Step 8, the data node manager (300) identifies a subset of the registered data nodes that includes data node A (310A) and data node B (310B). The registered data nodes includes other data nodes connected to the data node manager (300), which are not included in FIG. 3 for the sake of brevity and clarity. At Step 9, the data node manager (300) sends a request for a sketch to data node A (310A). In response to obtaining the request, at Step 10, data node A (310A) determines that it includes a previously generated sketch. In response to the determination, at Step 11, data node A (310A) performs dataset distillation using the previous sketch to obtain a new sketch. After that, at Step 12, data node A (310A) sends the new sketch to the data node manager (300).

At Step 13, the data node manager (300) sends a request for a sketch to data node B (310B). In response to obtaining the request, at Step 14, data node B (310B) determines that it does not include a previously generated sketch, as it was deleted prior to Step 1. In response to the determination, at Step 15, data node B (310B) is able to perform dataset distillation. In response to the determination, at Step 16, data node B (310B) performs dataset distillation using a random initial sketch to obtain a new sketch. After that, at Step 17, data node B (310B) sends the new sketch to the data node manager (300).

In response to obtaining sketches from both data node A (310A) and data node B (310B), at Step 18, the data node manager (300) makes a determination that sketches were obtained from all data nodes of the subset of registered data nodes (310A, 310B). At Step 19, the data node manager (300) merges the sketches to obtain a central sketch. Then, at Step 20, the data node manager (300) determines that the central sketch includes at least the minimum number of required samples and is therefore acceptable. In response to the determination, at Step 21, the data node manager (300) generates a new prediction model using the central sketch. At Step 22, the data node manager deploys the new prediction model to data node A (310A) and data node B (310B). Data node A (310A) and data node B (310B) may optimize the new prediction model using respective verification data.

Data node A (310A) and data node B (310B) may use their optimized new prediction models to perform inferencing. At Step 23, the data node manager (300) updates the data node registry to: (i) include data node C (310C), (ii) specify that the previous prediction model was deployed to data node C (310C), (iii) include the central sketch and the new prediction model, and (iv) specify that the new prediction model is deployed to data node A (310A) and data node B (310B).

END OF EXAMPLE

Figure 4:
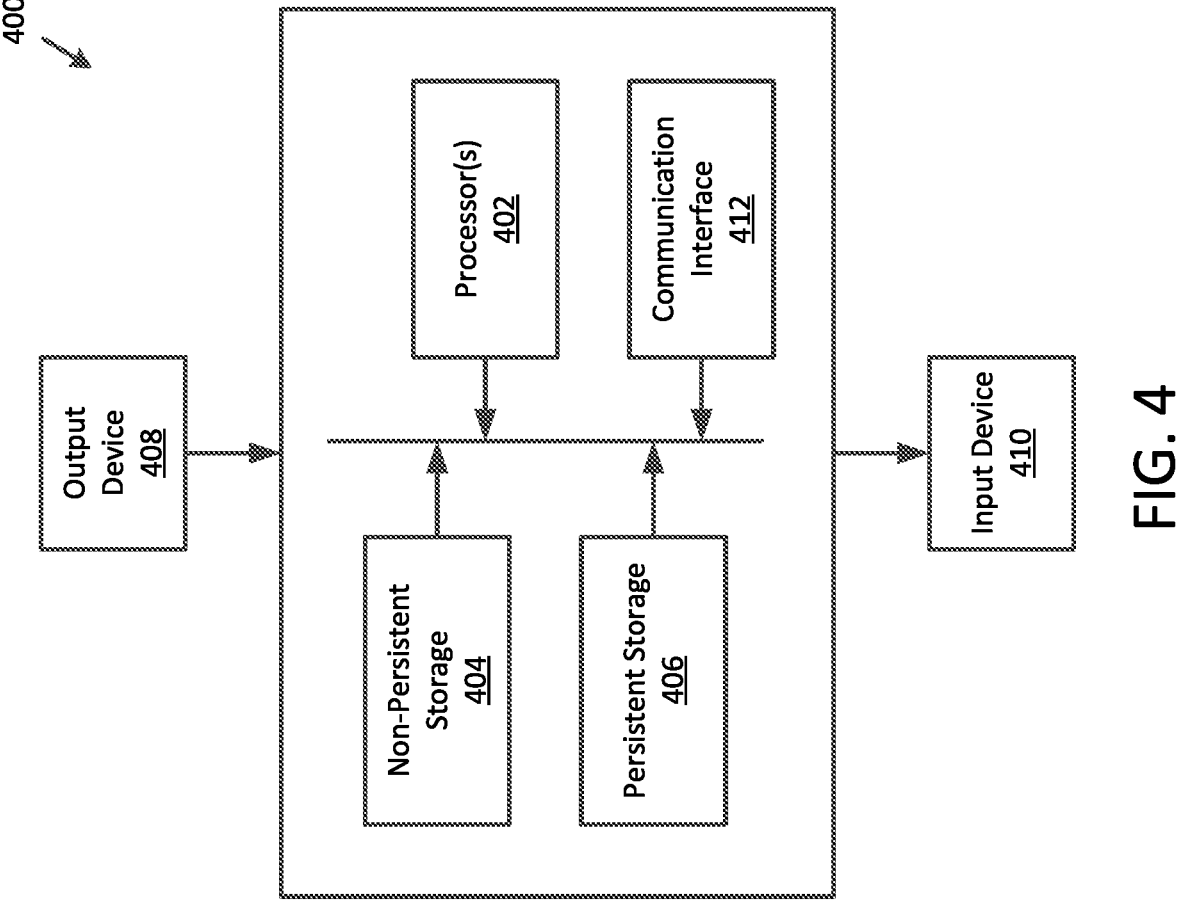
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to deploying prediction models to data nodes using distributed dataset distillation. Accordingly, prediction models may be deployed to data nodes without the transmission of large quantities of data node data typically required to train prediction models representative of a large number of data nodes in a dynamic environment. This may improve the efficiency of deploying prediction models to data nodes by circumventing the requirement of transmission of large quantities of data node data between the data nodes and the data node manager to deploy prediction models. Additionally, sketches obtained from a subset of registered data nodes representative of the data nodes may be used to efficiently deploy new prediction models to data nodes as the quantity of data nodes grow without compromising prediction model accuracy. By using distributed distillation to deploy prediction models, the data nodes may reduce the amount of data stored locally for prediction model training purposes.

Thus, embodiments of the invention may address the problem of inefficient use of computing resources to deploy prediction models to data nodes. This problem arises due to the technological nature of the environment in which the data nodes operate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data nodes, the method comprising:

identifying, by a data node manager executing in a data center and operatively connected to associated with a plurality of data nodes, a model deployment event, wherein the model deployment event comprises an event that indicates a prediction model is to be deployed to the plurality of data nodes, wherein each of the plurality of data nodes is a vehicle;

in response to identifying the model deployment event:

generating, by the data node manager, a new model using model generation information from a subset of the plurality of data nodes specified by a data node registry, comprising:

identifying, by the data node manager, the subset of the plurality of data nodes using the data node registry, sending, by the data node manager, a request for sketches to the subset of the plurality of data nodes, obtaining, in response to the request for sketches, a plurality of sketches from the subset of the plurality of data nodes, wherein a data node of the subset of the plurality of data nodes generates a sketch of the plurality of sketches by performing dataset distillation using a previous sketch to generate the sketch, and sending the sketch to the data node manager, and wherein the sketch within the plurality of sketches comprises a data structure comprising a partial representation of the node data associated with the data node of plurality of data nodes merging the plurality of sketches to obtain a central sketch;

and applying initial model parameters and a prediction model training algorithm to the central sketch to generate the new model, wherein the initial model parameters comprise neural network weights and learning rates, and wherein the central sketch is used in place of the node data required to create the new model;

deploying, by the data node manager, the new model to the plurality of data nodes;

and updating the data node registry based on the new model to obtain an updated data node registry.

2. The method of claim 1, further comprises:

prior to the generating, by the data node manager, the new model using model generation information from the subset of the plurality of data nodes specified by the data node registry:

making a first determination, by the data node manager, that the model deployment event is associated with a new data node; and in response to the first determination:

deploying, by the data node manager, a previously generated model to the new data node.

3. The method of claim 2, wherein the updated data node registry specifies:

the plurality of data nodes, and the new data node.

4. The method of claim 3, wherein in response to deploying the previously generated model to the new data node, the new data node:

obtains the previously generated model; and refines the previously generated model using local data.

5. A non-transitory computer readable medium comprising computer readable program code, which when executed by a computer processor enables the computer processor to perform a method for managing data nodes, the method comprising:

identifying, by a data node manager executing in a data center and operatively connected to a plurality of data nodes, a model deployment event, wherein the model deployment event comprises an event that indicates a prediction model is to be deployed to the plurality of data nodes, wherein each of the plurality of data nodes is a vehicle;

in response to identifying the model deployment event:

generating, by the data node manager, a new model using model generation information from a subset of the plurality of data nodes specified by a data node registry, comprising:

identifying, by the data node manager, the subset of the plurality of data nodes using the data node registry;

sending, by the data node manager, a request for sketches to the subset of the plurality of data nodes;

obtaining, in response to the request for sketches, a plurality of sketches from the subset of the plurality of data nodes wherein a data node of the subset of the plurality of data nodes generates a sketch of the plurality of sketches by determining that the data node does not have a previous sketch and that the data node is capable of performing dataset distillation, wherein, based on the determination, performing data distillation to generate the sketch, and sending the sketch to the data node manager, wherein a sketch within the plurality of sketches comprises a data structure comprising a partial representation of the node data associated with the plurality of data nodes merging the plurality of sketches to obtain a central sketch;

and applying initial model parameters and a prediction model training algorithm to the central sketch to generate the new model, wherein the initial model parameters comprise neural network weights and learning rates, and wherein the central sketch is used in place of the node data required to create the new model;

deploying, by the data node manager, the new model to the plurality of data nodes;

and updating the data node registry based on the new model to obtain an updated data node registry.

6. The non-transitory computer readable medium of claim 5, wherein the method further comprises:

prior to the generating, by the data node manager, the new model using model generation information from the subset of the plurality of data nodes specified by the data node registry:

making a first determination, by the data node manager, that the model deployment event is associated with a new data node; and in response to the first determination:

deploying, by the data node manager, a previously generated model to the new data node.

7. The non-transitory computer readable medium of claim 6, wherein the updated data node registry specifies:

the plurality of data nodes, and the new data node.

8. The non-transitory computer readable medium of claim 7, wherein in response to the deploying the previously generated model to the new data node, the new data node:

obtains the previously generated model; and refines the previously generated model using local data.

9. A system for managing data nodes, the system comprising:

a data node manager executing in a data center and operatively connected to a plurality of data nodes, a plurality of vehicles, wherein each of the vehicles comprises one of a plurality of data nodes;

wherein the data node manager is configured to:

identify a model deployment event, wherein the model deployment event comprises an event that indicates a prediction model is to be deployed to the plurality of data nodes;

in response to identifying the model deployment event:

generate, by the data node manager, a new model using model generation information from a subset of the plurality of data nodes specified by a data node registry, comprising:

obtaining a plurality of sketches using one or more dataset distillations from the subset of the plurality of data nodes, wherein a sketch within the plurality of sketches comprises a data structure comprising a partial representation of the node data associated with the plurality of data nodes, and wherein the node data is not transferred to the data node manager;

merging a plurality of sketches to obtain a central sketch, wherein the central sketch comprises a complete representation of the node data;

and applying initial model parameters and a prediction model training algorithm to the central sketch to generate the new model, wherein the initial model parameters comprise neural network weights and learning rates, and wherein the central sketch is used in place of the node data required to create the new model;

deploy, by the data node manager, the new model to the plurality of data nodes; and update the data node registry based on the new model to obtain an updated data node registry.

10. The system of claim 9, wherein the data node manager is further configured to:

prior to the generating, the new model using model generation information from the subset of the plurality of data nodes specified by the data node registry:

make a first determination, by the data node manager, that the model deployment event is associated with a new data node; and in response to the first determination:

deploy, by the data node manager, a previously generated model to the new data node.

11. The system of claim 10, wherein the updated data node registry specifies:

the plurality of data nodes, and the new data node.

12. The system of claim 11, wherein in response to the deploying the previously generated model to the new data node, the new data node is configured to:

obtain the previously generated model; and refine the previously generated model using local data.

* * * * *